(12) United States Patent
Zinn et al.

(10) Patent No.: US 9,528,898 B2
(45) Date of Patent: Dec. 27, 2016

(54) PROBE FOR MEASURING PRESSURE OSCILLATIONS IN THE COMBUSTOR OF A GAS TURBINE

(71) Applicant: ALSTOM Technology Ltd, Baden (CH)

(72) Inventors: Hanspeter Zinn, Baden-Rüthihof (CH); Nicolas Noiray, Bern (CH); Bruno Schuermans, La Tour de Peilz (CH); Danda-Raj Pahari, Baden (CH); Dejan Rajkovic, Karlovac (HR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 73 days.

(21) Appl. No.: 14/661,244

(22) Filed: Mar. 18, 2015

(65) Prior Publication Data

US 2015/0268121 A1    Sep. 24, 2015

(30) Foreign Application Priority Data

Mar. 19, 2014    (EP) .................................... 14160734

(51) Int. Cl.
*G01L 7/00*    (2006.01)
*G01L 23/26*    (2006.01)
*G01L 19/06*    (2006.01)
*G01L 23/08*    (2006.01)

(52) U.S. Cl.
CPC ........... *G01L 23/26* (2013.01); *G01L 19/0681* (2013.01); *G01L 23/08* (2013.01)

(58) Field of Classification Search
None
See application file for complete search history.

(56) References Cited

U.S. PATENT DOCUMENTS

| | | | |
|---|---|---|---|
| 6,550,336 B2 | 4/2003 | Brehm et al. | |
| 6,568,416 B2* | 5/2003 | Tucker | G05D 16/2053 137/14 |
| 6,708,568 B2* | 3/2004 | Gleeson | F01D 21/003 73/700 |
| 6,813,925 B2* | 11/2004 | Naumiec | G01L 27/005 73/1.66 |
| 6,857,320 B2* | 2/2005 | Gleeson | F01D 21/003 73/756 |
| 6,978,680 B2* | 12/2005 | Gleeson | F01D 17/08 73/1.71 |
| 2006/0005388 A1* | 1/2006 | Dick | F02M 51/0603 29/890.124 |

FOREIGN PATENT DOCUMENTS

DE    10 2007 035 013 A1    2/2008
EP           1 967 834 A2    9/2008

\* cited by examiner

*Primary Examiner* — Andre Allen
(74) *Attorney, Agent, or Firm* — Buchanan Ingersoll & Rooney PC (57) ABSTRACT

A probe is provided for measuring high frequent pressure oscillations of hot gases that combines redundancy of the output signals with high quality of the output signals.

15 Claims, 6 Drawing Sheets

PROBE FOR MEASURING PRESSURE OSCILLATIONS IN THE COMBUSTOR OF A GAS TURBINE

CROSS-REFERENCE TO RELATED APPLICATIONS

This application claims priority to European application 14160734.1 filed Mar. 19, 2014, the contents of which are hereby incorporated in its entirety.

TECHNICAL FIELD

The present invention relates to a probe for measuring pressure oscillations. It relates in particular to probes for measuring pressure oscillations in combustors of gas turbines. It furthermore relates to the use of probes according to the invention.

BACKGROUND

Figure 2:
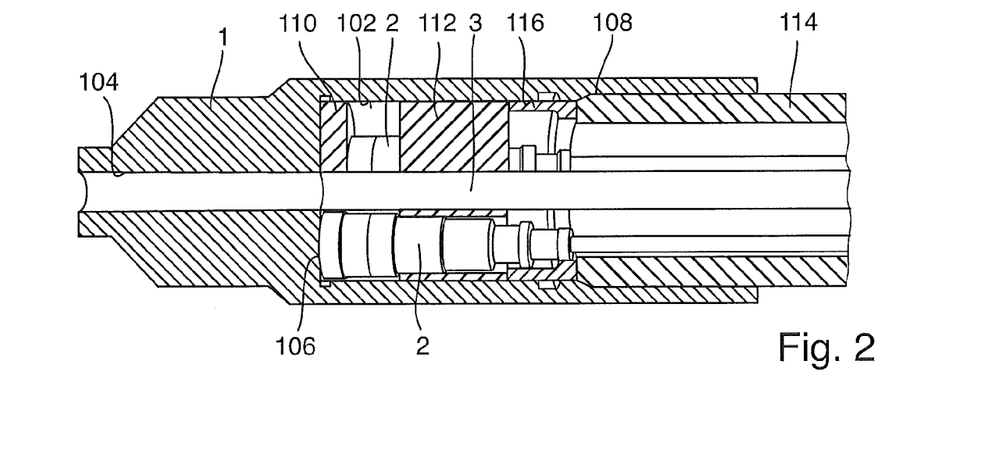
FIG. 2 shows a mounting situation of the claimed probe inside a gas turbine.

Pressure oscillations occurring in the combustors of modern gas turbines, so-called combustor pulsations or combustion pulsations, often also simply called pulsations, provide important indications of the quality of the combustion, especially when employing premix burner technology. Under unfavorable conditions, the combustor pulsations may reach amplitudes at which the mechanical integrity of gas turbine components is at risk. This means that a permanent monitoring of combustor pressure oscillations basically is now indispensable. Because of the high temperatures, a direct detection of occurring pressure oscillations requires high-temperature-resistant pressure sensors, which on the one hand are very expensive, and on the other hand are confronted with usage conditions that are so extreme that a significant probability of failure exists during continuous operation. It is also known that the sensor characteristic of such sensors is temperature-dependent, which also makes the quantification of the measured pressure oscillations harder or allows it only with limited accuracy. From DE 10 2007 035 013 A1 a combustion monitoring system comprising a probe with one pressure transmitter is known. FIG. 2 of DE 10 2007 035 013 A1 illustrates the installation of that probe with its tip and its pressure transmitter located inside a flue socket.

U.S. Pat. No. 6,550,336 B2 describes a combustion monitoring system comprising sensor that is set back from the combustor wall a distance by means of a semi-infinite tube in order to not expose the sensor to the high temperatures of the combustion. In these
so-called long-line probes, the actual measuring point within the gas turbine combustor is connected by means of a line, basically by means of a small tube, with a pressure transmitter positioned outside of the combustor. This concept exposes the pressure transmitter to lower temperatures due to distance between the combustor chamber and the pressure transmitter. For this reason, substantially cheaper pressure transmitters or microphones, whose useful life and measuring accuracy is not limited by extreme usage conditions, can be used.

In such a configuration, it is important to ensure an echo-free termination of the measuring line formed in this manner, and, if possible, to also avoid any type of reflections within the measuring line. The termination of the measuring tube with a semi-infinite tube is known. This is realized with a line having a long length, which line is connected on a first end with the end of the measuring tube facing away from the measuring point. With sufficient length, the pressure oscillations are attenuated inside the semi-infinite tube as a result of internal dissipation in such a way that no amplitude worth mentioning is reflected anymore at the second end of the semi-infinite tube.

At higher amplitudes the recorded acoustic signal is distorted and does not contain the full range of frequencies. The reason is the very long distance between the combustor area and the pressure transmitter, which is located outside the engine casing. Additionally, temperature and pressure effects further add or reduce frequency depending damping of the signal. A complicated calibration concept would therefore be needed to calibrate the probe for practical use.

Basically, both currently available approaches do not allow for a accurate and redundant pulsation measurement: Multiple pressure transmitters outside the casing will not capture the full frequency range of interest because they are not close enough to the combustor and the long line probe with pressure transmitters mounted on the back and suffers from frequency dependent damping and signal distortion.

It is an object of the claimed invention to overcome the disadvantages of the prior art and provide redundant probe that captures the full frequency range of interest without significant signal distortion and damping.

SUMMARY

These objects are achieved by means of probe for measuring pressure oscillations, which probe comprises the following elements:

A sensor holder comprising a stepped bore with a measuring bore and a shoulder, a pressure transmitter, which is in connection with the interior of the measuring bore, wherein the stepped bore receives a sensor plate that holds at least two or more pressure transmitters, and that a face of the sensor plate and the shoulder limit a cavity thereby connecting the measuring bore with sensing surfaces or membranes of at least two pressure transmitter.

The cavity between the shoulder of the stepped bore and the face of the sensor plate distributes the pressure oscillations from the measuring bore. This allows arranging more than one pressure transmitter in a way that the pressure sensitive surfaces of the pressure transmitters are flush with the cavity and therefore the pressure sensitive surfaces or sensor membranes receive the pressure oscillations distributed inside the cavity. Consequently redundant pressure signal from the pressure transmitters can be obtained and used for controlling the gas turbine. Since there are for example three redundant output signals from the three pressure transmitters available it is possible to detect faulty output signals of one of the pressure transmitters.

Since this cavity may be arranged near the combustion chamber of a gas turbine the pressure oscillations in the cavity are not distorted or damped and therefore the output signals of the pressure transmitters have a high quality.

Since the cavity is limited by the shoulder of the stepped measuring bore and the face of the sensor plate it is possible to locate the cavity itself in the face of the sensor plate and/or the shoulder of the stepped bore. Since the face of the sensor plate can easier be machined for example by milling or other processes, in most cases the cavity is part of the sensor plate.

To distort the pressure oscillations of the measuring bore inside the cavity as little as possible it is preferred to keep the volume of the cavity as small as possible. This leads to a clover like geometry of the cavity. It has been found out, that a depth of the cavity of between 0.2 mm up to 1 mm is sufficient.

To further improve the quality of the pressure oscillations inside the cavity and on the sensor membranes it is preferred that the measuring bore is connected with a semi-infinite tube. This semi-infinite tube may have a length for examples more than 15 meters up to 30 meters or 50 meters. Its inner diameter is preferably similar to the inner diameter of the measuring bore and is between 4 mm and 8 mm, preferably 6 mm.

Due to this design the positive effects on the quality of measuring the pressure oscillations of a semi-infinite tube can be used in conjunction with the claimed invention, too.

In a further advantageous embodiment of the claimed invention the probe comprises a support disc. The support disc and the sensor plate each comprise one bore for each sensor or each pressure transmitter and each pressure transmitter has a stepped contour. This allows transferring an axial force from the support disc via the pressure transmitters to the sensor plate. Doing so, a gas tight seal between the shoulder of the stepped measuring bore and the face of the sensor plate is achieved and no hot gas, which may comprise aggressive pollutants, may leave the cavity.

To apply such an axial force to the support disc in a preferred embodiment of the claimed invention the probe comprises clamping means, the sensor holder comprises a thread and the clamping means interact with the thread to apply an axial force to the support disc, the at least one sensor and the sensor plate.

In preferred embodiment the clamping means is a hollow screw or a supporting tube and the sensor holder comprises an internal thread. This means that by fastening the hollow screw an axial force is applied to the support disc and consequently to the sensor plate.

To protect the semi-infinite tube from damages in a further embodiment of the claimed invention the probe comprises a protecting tube. This protecting tube covers not only the semi-infinite tube, but also protects the wiring of the pressure transmitters from mechanical damages.

Since the claimed probe is installed in a gas turbines were high temperature occur, and the probe has quite a length, compensator means are preferred that allow the semi-infinite tube to expand to an axial direction due to thermal expansion.

The claimed invention is described in more detail below in reference to the drawings.

DETAILED DESCRIPTION

Figure 1:
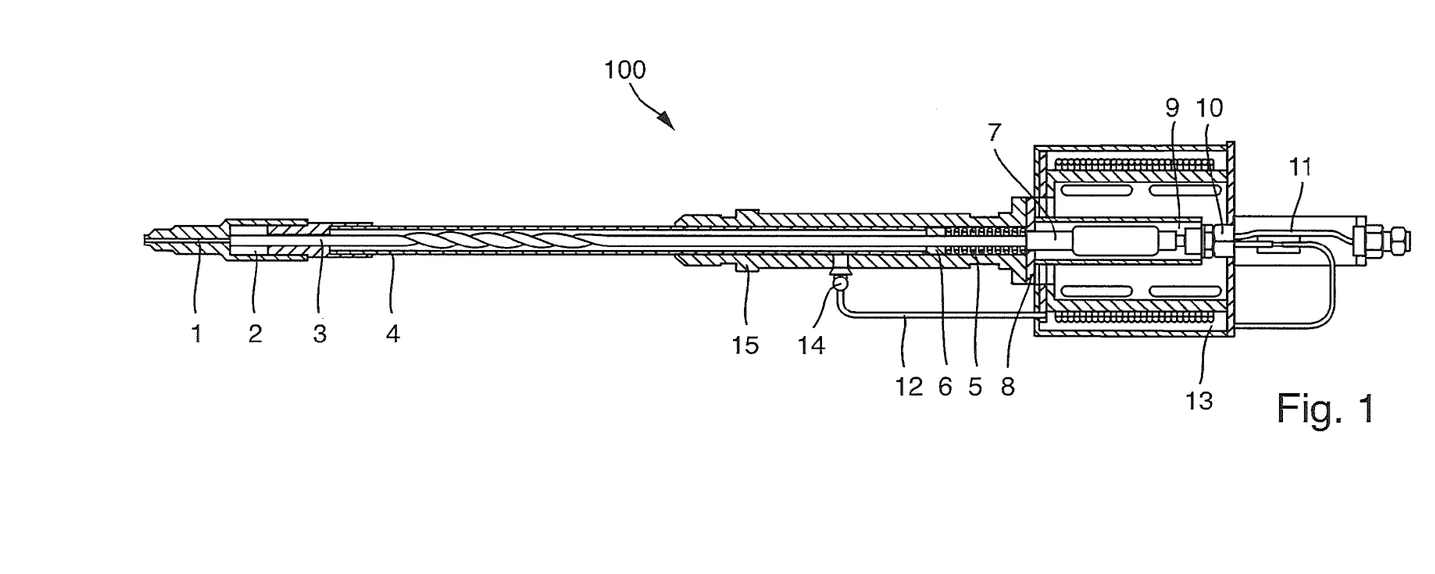
FIG. 1 shows a probe constructed according to the invention.

FIG. 1 illustrates the embodiment of a claimed probe 100. At the left side of FIG. 1 a sensor holder 1 with three pressure transmitters 2 a semi-infinite tube 3 as well as a guiding pipe 4 can be seen. On the right hand side of FIG. 1 compensating means as well as a drum for the semi-infinite tube 3 can be seen. As can be seen from FIG. 1 at the guiding pipe 4 is supported by a housing 15 and compensating means. The details of this probe 100 are explained in conjunction with the following figures. The tip of the probe 100 (at the left hand side of FIG. 1) is installed in a flue socket for example of a gas turbine that has been explained in conjunction of FIG. 2 of DE 10 2007 035 013 A1. In other words: the claimed probe 100 may be used as a retrofit solution for the probe described in DE 10 2007 035 013 A1.

FIG. 2 shows a cross section of the sensor holder 1 with three pressure transmitters 2 and the semi-infinite tube 3. Since FIG. 2 is a cross section only two of the three pressure transmitters 2 are visible.

As can be seen from FIG. 2 the sensor holder 1 comprises a stepped bore 102. The part of the stepped bore at the left hand side of FIG. 2 is also referred to as measuring bore 104.

The measuring bore 104 opens to the ambient at the tip of the sensor holder 1. On the right hand side the measuring bore 104 ends at a shoulder 106. The stepped bore 102 comprises at its end opposite to the tip of the sensor holder 1 an internal thread 108.

Starting from the shoulder 106 inside the stepped bore 102 a sensor plate 110, that receives three sensors 2 and a support disc 112 are arranged.

The internal thread 108 of the sensor holder 1 cooperates with a hollow screw 114. The hollow screw 114 may be an integral part of the protecting pipe 4 or may be separate from the protecting pipe 4. Between the face of the hollow screw 114 (and the support disc 112) an optional spacer 116 is installed.

By fastening the hollow screw 114 the sensor plate 110 is pressed against the shoulder 106 of the sensor holder 1. The axial force is transferred via the spacer 116, the support disc 112, and the pressure transmitters 2 to the sensor plate 110.

Figure 3:
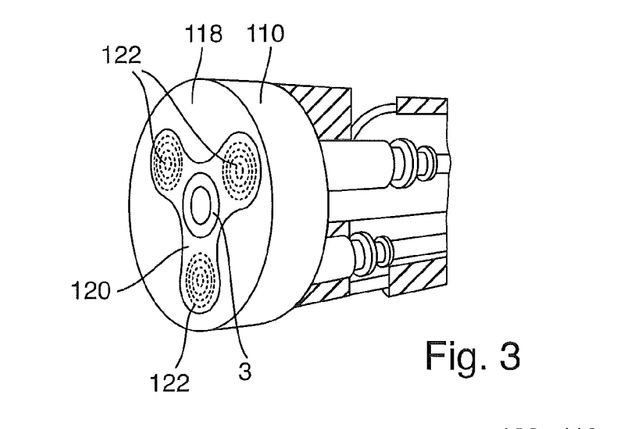
FIG. 3 shows a cross section of the probe tip with three sensors.

In FIG. 3 a front view of the sensor mounting assembly without the sensor holder 1 is illustrated. In FIG. 3 it can be seen that at the face 118 of the sensor plate 110 a clover like cavity 120 is machined. The end of the semi-infinite tube 3 is flush with the bottom of the cavity 120. The cavity 120 connects the membranes 122 of the pressure transmitters 2 and the measuring bore 104 and semi-infinite tube 3. The semi-infinite tube 3 may be welded to the sensor plate 110.

The clover like design of the cavity 120 reduces the volume of the cavity 120 and in an optimal way connects the measuring bore 104 and the semi-infinite tube 3 with the membranes 122 of the three pressure transmitters 2 so that the pressure oscillations inside the measuring bore 104 and the infinite tube 3 may be detected by the three pressure transmitters 2 without any significant distortion or damping.

Consequently, the pressure transmitters 2 very exactly detect the pressure oscillations inside the measuring bore 104. Since there are three pressure transmitters 2 exposed to the same oscillations redundancy of the output signals of the pressure transmitters 2 is achieved. Under normal operating conditions the output signals of the three pressure transmitters 2 should be more or less equal.

In case one of the pressure transmitters 2 is defect, the output signal of this defect pressure transmitter differs significantly from the output signals of the remaining two pressure transmitters 2 and therefore the output signal of the defect pressure transmitter 2 may be ignored until this pressure transmitter 2 has been repaired or replaced.

To reduce the volume of the cavity 120 to a minimum it is preferred that the membranes 122 of the pressure transmitters 2 are perpendicular to the longitudinal axis of the measuring bore 104. It has been sufficient if the depth of the cavity 120 is in a range between 0.2 mm to 1.0 mm.

Figure 4:
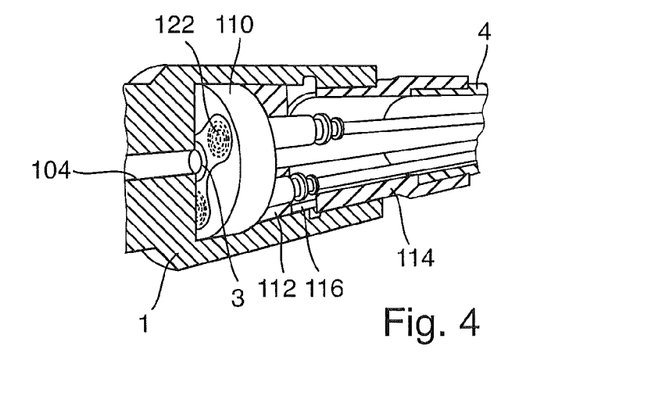
FIG. 4 shows a front view of the sensor mounting assembly.

FIG. 4 is a perspective view of the situation illustrated in FIG. 2, but with the sensor holder 1, and again it illustrates that the volume of the cavity 120 is minimized in order to influence the pressure oscillations as little as possible. Further, it can be seen that the hollow screw 114 at its end opposite to the sensor plate 110 receives the protecting tube 4.

Figure 5:
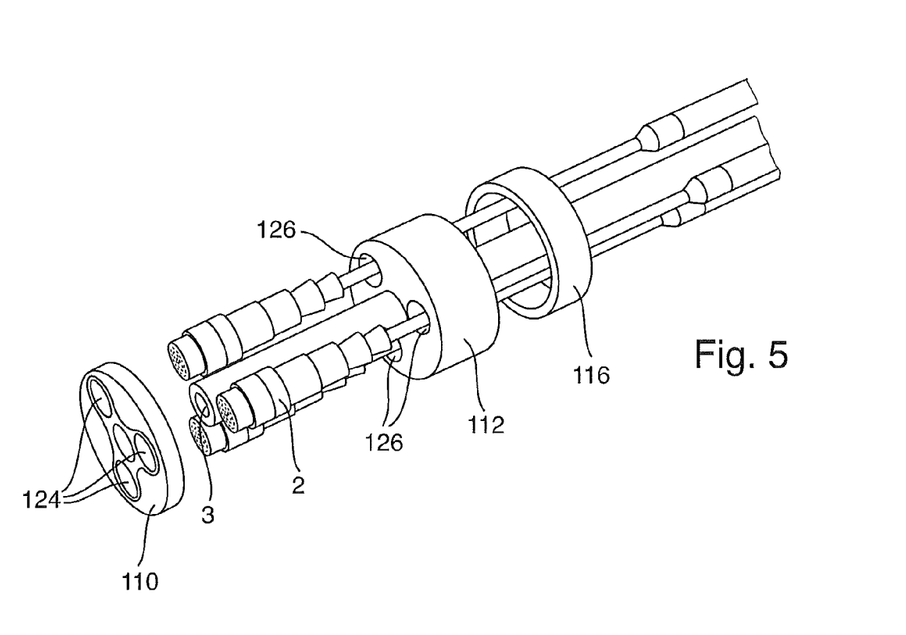
FIG. 5 shows an exploded view of the sensor mounting assembly.

FIG. 5 is an exploded of the sensor plate 110, the pressure transmitters 2, the support plate 112 and the spacer 116.

The sensor plate 110 comprises a bore 124 for each of the bores 124 receiving one pressure transmitter 2. In a similar manner the support disc 112 comprises three bores 126. The bores 124 and 126 may be stepped. Due to thickness of the sensor plate 110 and the stepped contour of the pressure transmitters 2 the membranes 122 are flush with the cavity 120 of the sensor plate 110 if the assembly is assembled. The stepped contour of the pressure transmitters 2 and the borers 124, 126 enable the transfer of an axial force from the hollow screw 114 to the sensor plate 110.

Figure 6:
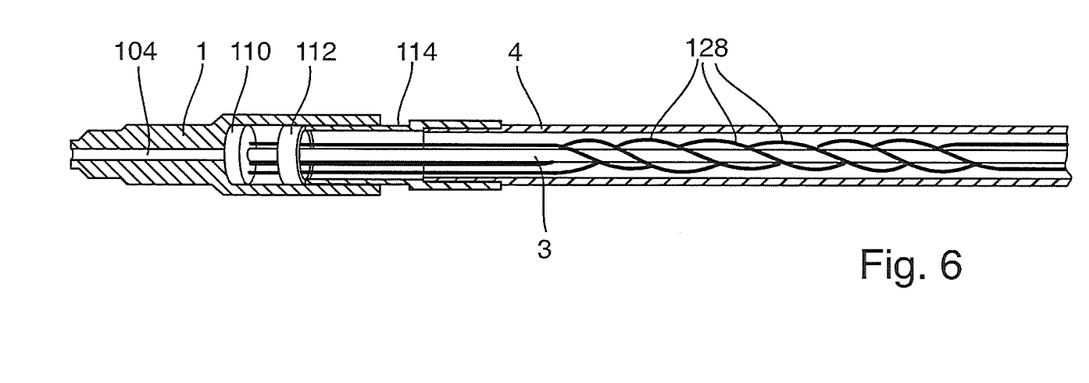
FIG. 6 shows the lead out of the sensor cables.

FIG. 6 illustrates lead out of these wires 128 (sensor signal cables) of the pressure transmitters 2 in a helical way around the semi-infinite tube 3 and inside the protecting tube 4. Since the wires 128 are wound around the semi-infinite tube 3 the risk of damages due to thermal expansion of the infinite tube and/or vibrations is reduced.

Figure 7:
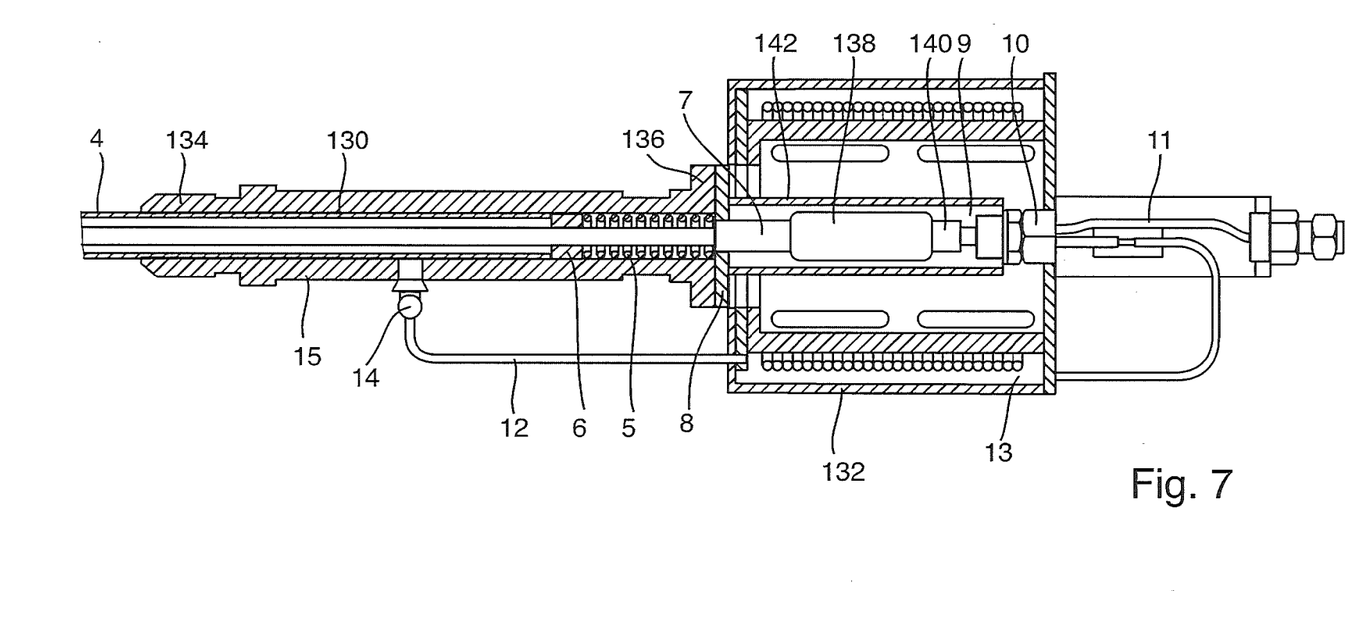
FIG. 7 shows details of the drum and the pressure seal of the probe.

FIG. 7 illustrates the housing 15 and the compensating means in detail. The reference number 11 in FIG. 7 shows the sensor signal cable.

The semi-infinite tube 3 is designated as semi-infinite because with the mentioned internal diameters, the pressure fluctuations to be measured—basically sound waves—are dissipated over this long length, and therefore can no longer be reflected at the end of the semi-infinite tube. This means that acoustically, the semi-infinite tube really acts in this direction as an infinite tube. In practical use of the installation, the handling of the long tube was found to be extremely problematic in the long-line probes as used up to now. Experience shows that components that are not very compact units are taken out of the way or stepped on, and that during continuous use a rather rough treatment must be expected. However, this is a very critical issue for a line designed as a semi-infinite tube. Such a line with an internal diameter of, for example, 6 mm, and an appropriate wall thickness is easily kinked or otherwise damaged at the inside wall, which consequently results in undesired reflections of pressure oscillations. According to the concept of the invention, the probe is therefore provided with a winding carrier or rolling plate module 13 that represents an integral component of the probe. The semi-infinite tube 3 is positioned as a winding on this module 13. This module is additionally covered by a protective sleeve 132. This ensures the integrity of the semi-infinite tube even when assembly and maintenance staff steps on the installed probe. At a second end 14, the semi-infinite tube 3 is connected to a toroidal space 130 and a flushing gas supply. The constructive design of the flushing gas supply poses very similar problems as the semi-infinite tube 3 in practical use: In order to ensure its mechanical integrity, the flushing gas supply must not be installed "freely floating" but must be integrated into a compact unit. According to the invention, this is achieved by placing the housing 15 around the protecting tube 4. Between the protecting tube 4 and the housing 15 the toroidal space 130 mentioned above is formed. Into this toroidal space 130, flushing gas can be introduced, which then flows through the semi-infinite tube 3 and the measuring tube 104 bore in the direction of the measuring-point-side end of the measuring bore 104. This prevents the penetration of hot and aggressive combustion gases into the measuring bore 104 and the contact of the pressure transmitters 2 with the combustion gases. The permanent flow of the flushing gas furthermore ensures a substantially constant temperature inside the measuring tube over its length.

The winding carrier or module 13 fulfills another function in connection with the flushing gas supply since the winding carrier 13 is provided with openings that ensure free circulation of air around the windings of the semi-infinite tube 3.

The housing 15 is provided at a front end with an outer thread 134, with which it is screwed into the outer sleeve of a gas turbine (not shown). The hosing 15 is hereby screwed into the outer sleeve so tightly that a seal seat of the outer tube in functional connection with a sealing ring or a sealing cord brings about a reliable sealing of the plenum pressure against external pressure. Naturally other devices known to the expert, for example, a flange joint, can be used for the attachment of the outer tube 12 to the outer sleeve 104 and the sealing.

On a front side of the housing 15 facing away from the measuring point, a plate 136 is mounted. This plate 136 serves as a first support for a pressure spring 5. A second support for the spring 5 is the stop bush 6 fixed in an axially movable manner to the semi-infinite tube 3. In this way, the pressure spring 6 is able to exert an axial force onto the protecting tube 4. The axial dimensions have been selected so that in the installed state an axial force is always exerted onto the protecting tube 4 in such a way that a gas-tight seat of the cone seat of the sensor holder 1 is ensured.

In addition, the spring-loaded, axially movable positioning of the semi-infinite tube 3 and the protecting tube 4 in the housing 15 ensures a compensation of differential expansions between the outer sleeve and the hood of the gas turbine on the one hand, and between the semi-infinite tube 3 and the housing 15 on the other hand, whereby the tightness of the cone seat on the hood and the sensor holder 1 is ensured.

The plate 136 is provided with an opening whose diameter is greater than that of the semi-infinite tube 3. This prevents binding of the semi-infinite tube 3 in the housing 15.

On the other hand, no gas-tight seat can be achieved between the axially movable support 6 and the housing 15, either. During operation, plenum pressure that still must be sealed off towards the atmosphere without hindering the axial movement between the protecting tube 4 and the housing 15 still exists at the through-opening of the plate 136. For this reason, the through-opening is followed in a gas-tight manner by a bellow 138 that is also attached to a bushing 140 in a gas-tight manner at a second end.

This bushing 140 is again provided with a high pressure fitting 10 for a gas-tight tube connection, for example a swagelock connection, which provides a gas-tight seal with respect to the two parts of the semi-infinite tube 3. The bushing 140 is positioned axially movable with a close sliding fit in a sheath 142 and in this way also fixes the semi-infinite tube 3 radially. The sheath 142 is connected in a fixed manner via the plate 136 with the housing 15.

The robust, radial support of the semi-infinite tube 3 at three positioning points in the rear part, and the preload through the spring 5 in the front part increase the natural vibration frequency of the actually thin and soft tube 3. On the one hand, this prevents vibration damage during continuous operation over several $10^4$ operating hours; on the other hand, vibrations of the entire measuring device, including the pressure transmitters 2 that could potentially falsify the measurement are essentially prevented.

Other embodiments and applications of the probe according to the invention will be obvious to the expert without deviating from the concept of the invention or exceeding the claimed scope of the invention.

Figure 8:
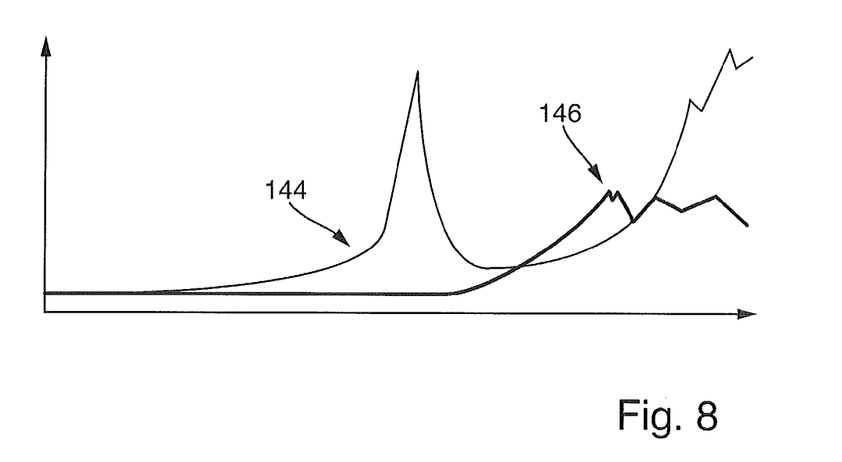
FIG. 8 shows the results of the claimed probe.

FIG. 8 illustrates the very good behavior of the claimed probe in a wide range of frequencies compared to a prior art probe.

The line 144 shows the test result of a conventional probe with a resonance frequency at approximately 3000 Hz. This resonance frequency influences the output signals of the pressure transmitter in a negative way.

The line 146 shows the test result of a probe according to the invention. This probe has no resonance frequency and consequently the quality of the output signals of the pressure transmitters 2 is improved.

The invention claimed is:

1. A probe for measuring pressure oscillations, the probe comprising the following elements:
a sensor holder comprising a stepped bore with a measuring bore and a shoulder, a pressure transmitter, which is in connection with the interior of the measuring bore, wherein
the stepped bore receives a sensor plate that holds at least two or more pressure transmitters, and that a face of the sensor plate and the shoulder limit a cavity thereby connecting the measuring bore with sensing surfaces or membranes of at least two pressure transmitters.

2. The probe according to claim 1, wherein the sensor plate and/or the shoulder comprises at its face a cavity.

3. The probe according to claim 1, wherein the cavity between the shoulder of the stepped bore and the face of the sensor plate distributes the pressure oscillations from the measuring bore.

4. The probe according to claim 1, wherein the cavity features a depth between 0.2 mm and 1 mm.

5. The probe according to claim 1, wherein the measuring bore is connected with a semi-infinite tube.

6. The probe according to claim 1, wherein the sensor plate is sealingly pressed against the shoulder.

7. The probe according to claim 1, further comprising a support disk, that the support disk and the sensor plate each comprise one bore for each pressure transmitter, and that each pressure transmitter has a stepped contour.

8. The probe according to claim 1, further comprising clamping means, that the sensor holder comprises a thread and in that the clamping means interact with the thread to apply an axial force to a support disk, the at least one pressure transmitter and the sensor plate.

9. The probe according to claim 8, wherein the clamping means is a hollow screw and in that the sensor holder comprises an internal thread.

10. The probe according to claim 5, further comprising a protecting tube to protect the semi-infinite tube and the wires of the pressure transmitters from damages.

11. The probe according to claim 5, further comprising a compensator means to allow the semi-infinite tube to expand in axial direction due to thermal expansion.

12. The probe according to claim 5, wherein the semi-infinite tube has a length of more than 40 meters and has the same internal diameter as the measuring bore.

13. The probe according to claim 10, further comprising a housing, that the housing and the protecting tube limit a toroidal space that is connected to a flushing gas supply.

14. A use of a probe according to claim 1 in a gas turbine, wherein the measuring-point-end of the measuring bore is open towards a combustor of the gas turbine.

15. A use of a probe according to claim 13, wherein the toroidal space is connected to a plenum of the gas turbine.

* * * * *